(12) United States Patent
Tsao

(10) Patent No.: US 10,881,052 B1
(45) Date of Patent: Jan. 5, 2021

(54) ILLUMINATING DEVICE FOR PLANT CULTIVATION

(71) Applicant: ARTLED TECHNOLOGY CORP., Taoyuan (TW)

(72) Inventor: Chia-Tsung Tsao, Taipei (TW)

(73) Assignee: Artled Technology Corp., Taoyuan (TW)

( * ) Notice: Subject to any disclaimer, the term of this patent is extended or adjusted under 35 U.S.C. 154(b) by 0 days.

(21) Appl. No.: 16/718,661

(22) Filed: Dec. 18, 2019

(51) Int. Cl.
*A01G 7/04* (2006.01)
*F21V 5/04* (2006.01)
*F21V 14/02* (2006.01)
*F21V 19/02* (2006.01)
*F21V 29/503* (2015.01)
*F21V 29/70* (2015.01)
*F21V 14/06* (2006.01)
*F21Y 115/10* (2016.01)

(52) U.S. Cl.
CPC .............. *A01G 7/045* (2013.01); *F21V 5/045* (2013.01); *F21V 14/02* (2013.01); *F21V 14/06* (2013.01); *F21V 19/02* (2013.01); *F21V 29/503* (2015.01); *F21V 29/70* (2015.01); *F21Y 2115/10* (2016.08)

(58) Field of Classification Search
CPC ....... A01G 7/045; F21V 29/503; F21V 29/70; F21V 5/045; F21V 14/02; F21V 14/06; F21V 19/02
See application file for complete search history.

(56) References Cited

U.S. PATENT DOCUMENTS

| | | | |
|---|---|---|---|
| 10,667,468 B1* | 6/2020 | Tang | H05B 45/10 |
| 2012/0121244 A1* | 5/2012 | Stavely | G02B 3/08 |
| | | | 396/175 |
| 2020/0060097 A1* | 2/2020 | Millar | H05B 47/105 |
| 2020/0060099 A1* | 2/2020 | Kim | A01G 7/045 |
| 2020/0107504 A1* | 4/2020 | Bongartz | A01G 7/045 |
| 2020/0187436 A1* | 6/2020 | Ching | A01G 27/008 |

* cited by examiner

*Primary Examiner* — Jong-Suk (James) Lee
*Assistant Examiner* — Christopher E Dunay
(74) *Attorney, Agent, or Firm* — Rosenberg, Klein & Lee

(57) ABSTRACT

An illuminating device for plant cultivation to cultivate plants has a base, a light source, a light converging plate, a position-adjusting device and a distance sensor. A height of the plants is detected by the distance sensor, and then a distance between the light source and the light converging plate is adjusted according to the height detected, and as a result, an illumination field of the light source is altered by the light converging plate. Therefore, an illumination field of the light passing through the converging plate is narrower to illuminate the plants located farther away and prevents waste of light energy. When the plants grow higher, the distance between the light source and the light converging plate is adjusted to provide a wider illumination field to ensure that light can be distributed evenly among the plants. Utilization efficiency of light energy is therefore improved.

14 Claims, 20 Drawing Sheets

ILLUMINATING DEVICE FOR PLANT CULTIVATION

BACKGROUND OF THE INVENTION

1. Field of the Invention

The present invention relates to a device for promoting growth of plants by providing illumination.

2. Description of the Prior Arts

In order to improve yields of edible plants, LEDs (Light Emitting Diode) with specifically tuned light spectrum have been widely adopted for plant cultivation nowadays, which allows the plants to grow nearly 24 hours per day and therefore shortens growth periods of the plants.

Based on modern research on plant cultivation, requirements of light sources for plant illumination include: high luminous efficacy, ability to maintain a stable PPFD (Photosynthetic Photon Flux Density) value above a specific threshold and to maintain a proper distance between the light sources and the plants.

However, with reference to FIG. 29, a conventional light source 90 has a fixed light distribution angle, and a position of the light source 90 is fixed. As a result, an illumination field of the light source 90 is also fixed. However, heights of some plants vary a lot during growth periods of the plants, and the difference in heights may exceed one meter. Therefore, the light source 90 has a larger light distribution angle (such as 120 degrees) to provide a wider illumination field to ensure that when top ends of the plants reach a higher position as the plants grow, the light can be distributed evenly among the plants, and the plants receive sufficient lighting (as shown in FIG. 29).

With reference to FIG. 30, however, because the light source 90 has a wide illumination field, when the plants are in initial growing stages and are lower in height, most light emitted by the light source 90 is distributed to places other than the plants, such as the ground adjacent to a cultivation frame. Therefore, utilization efficiency of light energy is very poor in the beginning, and improves gradually as the plants grow higher.

A major maintenance cost of a plant cultivation factory is the cost of electricity. The conventional light source 90 not only wastes energy due to low utilization efficiency of light energy, but also takes more time or requires a more powerful light source to provide the plants with equal amount of light energy, which further results in higher cost of electricity. Therefore, the conventional illuminating device for plant cultivation needs to be improved.

To overcome the shortcomings, the present invention provides an illuminating device for plant cultivation to mitigate or obviate the aforementioned problems.

SUMMARY OF THE INVENTION

The main objective of the present invention is to provide an illuminating device for plant cultivation. An illumination field provided by the illuminating device is adjustable according to growing statuses of plants, thereby maintaining high utilization efficiency of light energy.

The illuminating device for plant cultivation has a base, at least one light source, at least one light converging plate, a position-adjusting device and a distance sensor. The at least one light source is mounted on the base. The at least one light converging plate is mounted on the base and located in an optical path of the at least one light source, and is capable of converging light emitted by the at least one light source. The position-adjusting device is connected to the at least one light source or the at least one light converging plate, and is capable of changing a distance between the at least one light source and the at least one light converging plate. The distance sensor faces toward a direction in which the at least one light source emits light, and detects a distance between an external object and the distance sensor. The distance sensor is electrically connected to the position adjusting device, and changes the distance between the at least one light source and the at least one light converging plate according to the distance, which is detected by the distance sensor, between the external object and the distance sensor.

The advantage of the present invention is that heights of the growing plants are detected by the distance sensor which detects a distance between top ends of the plants and the distance sensor. A distance between the light source and the light converging plate is then adjusted according to the distance detected by the distance sensor, and therefore the illumination field of the light source is altered by the light converging plate.

As a result, when the plants are in initial growing stages, i.e., the plants are far away from the distance sensor, the illumination field of the light passing through the light converging plate is made narrower to converge light on the plants disposed farther away to prevent waste of light energy due to light energy being distributed to places other than the plants.

As the plants grow higher, the illumination field of the light passing through the light converging plate is made wider by increasing the distance between the light source and the light converging plate to ensure that the light can be distributed evenly among the plants, and the plants receive sufficient lighting. As a result, the light energy can be used effectively by the present invention, thereby saving energy.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
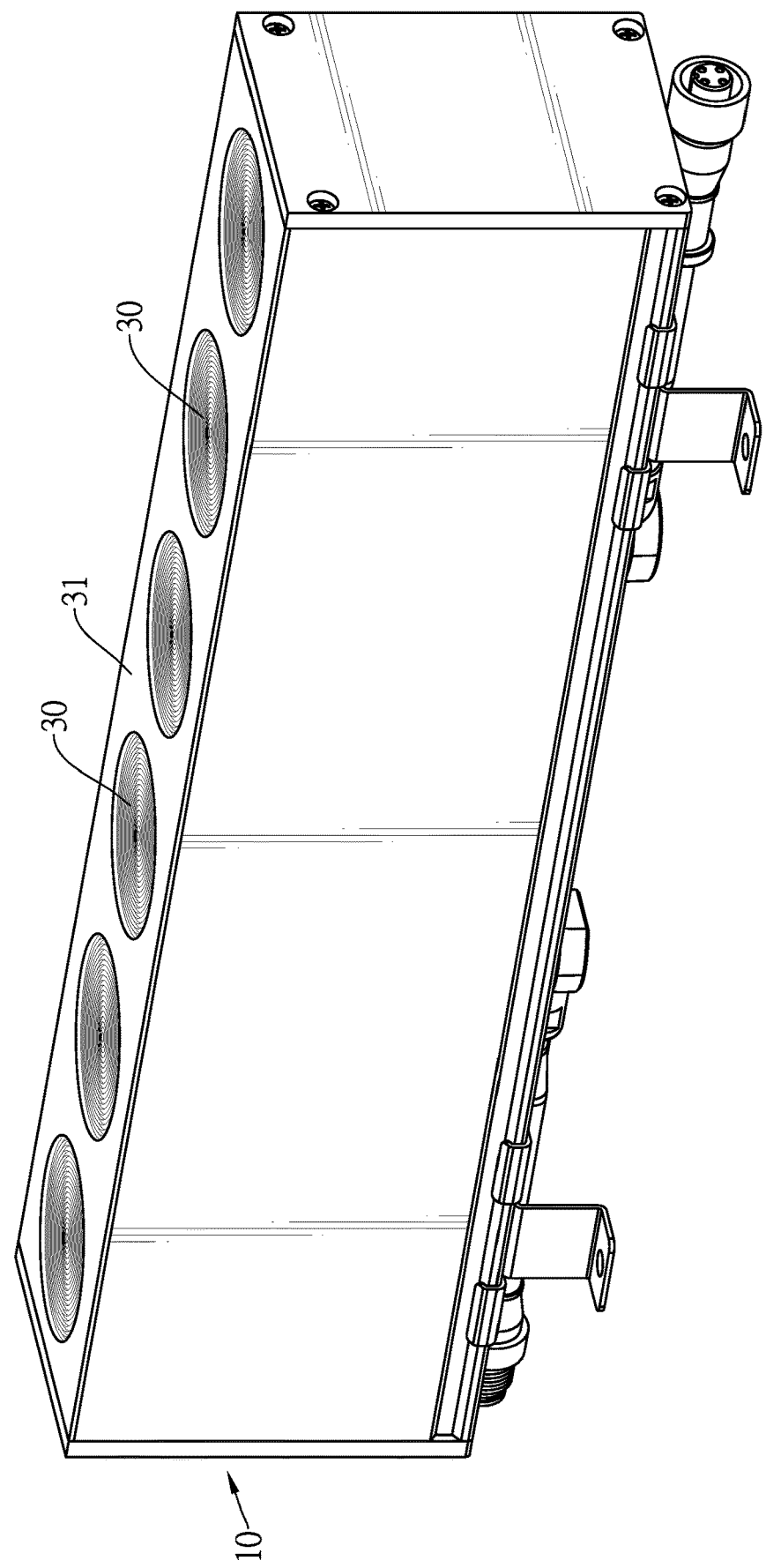
FIG. 1 is a perspective view of an illuminating device for plant cultivation in accordance with the present invention.
Figure 2:
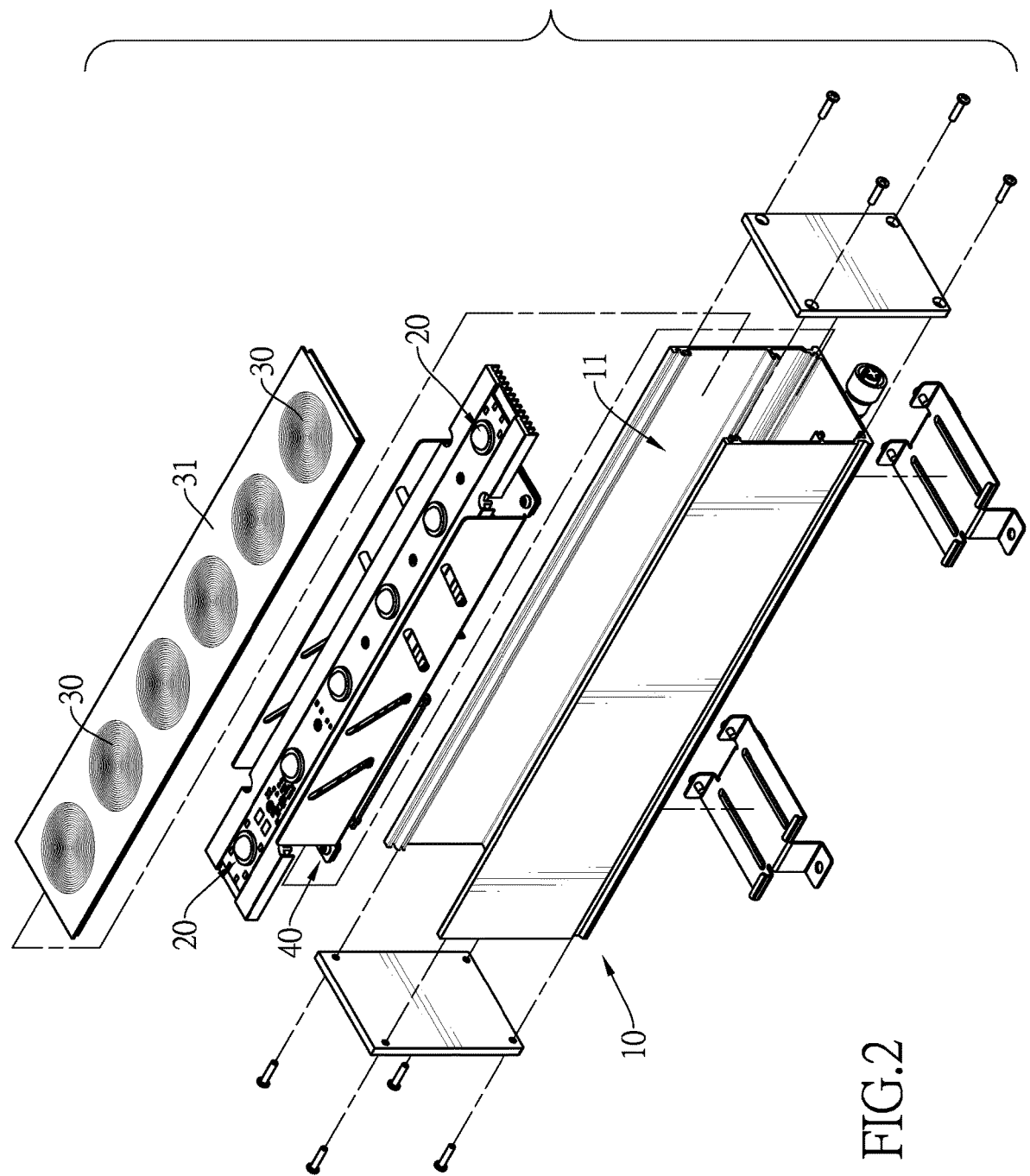
FIG. 2 is an exploded view of the illuminating device in FIG. 1.
Figure 12:
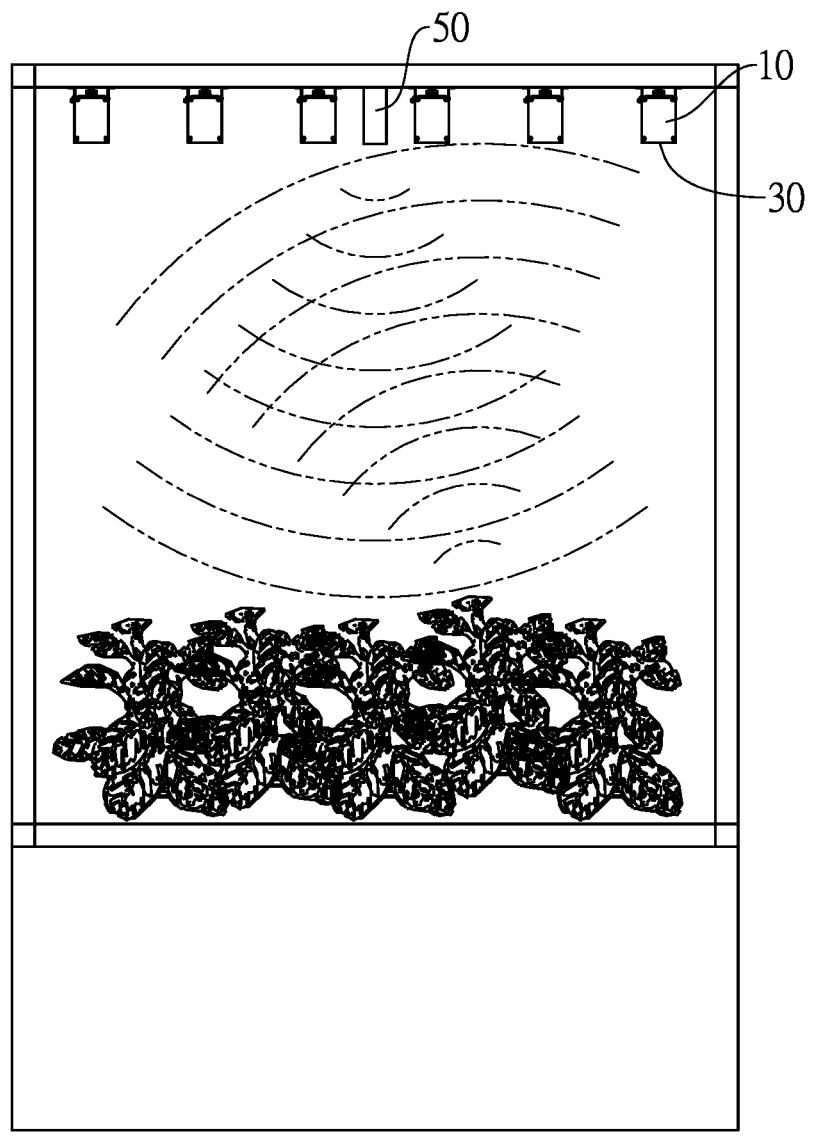
FIG. 12 is a schematic side view of a distance sensor in accordance with the present invention, showing an operating status of the distance sensor.

With reference to FIGS. 1, 2 and 12, an illuminating device for plant cultivation in accordance with the present invention comprises a base 10, multiple light sources 20, multiple light converging plates 30, a position-adjusting device 40 and a distance sensor 50.

Figure 6:
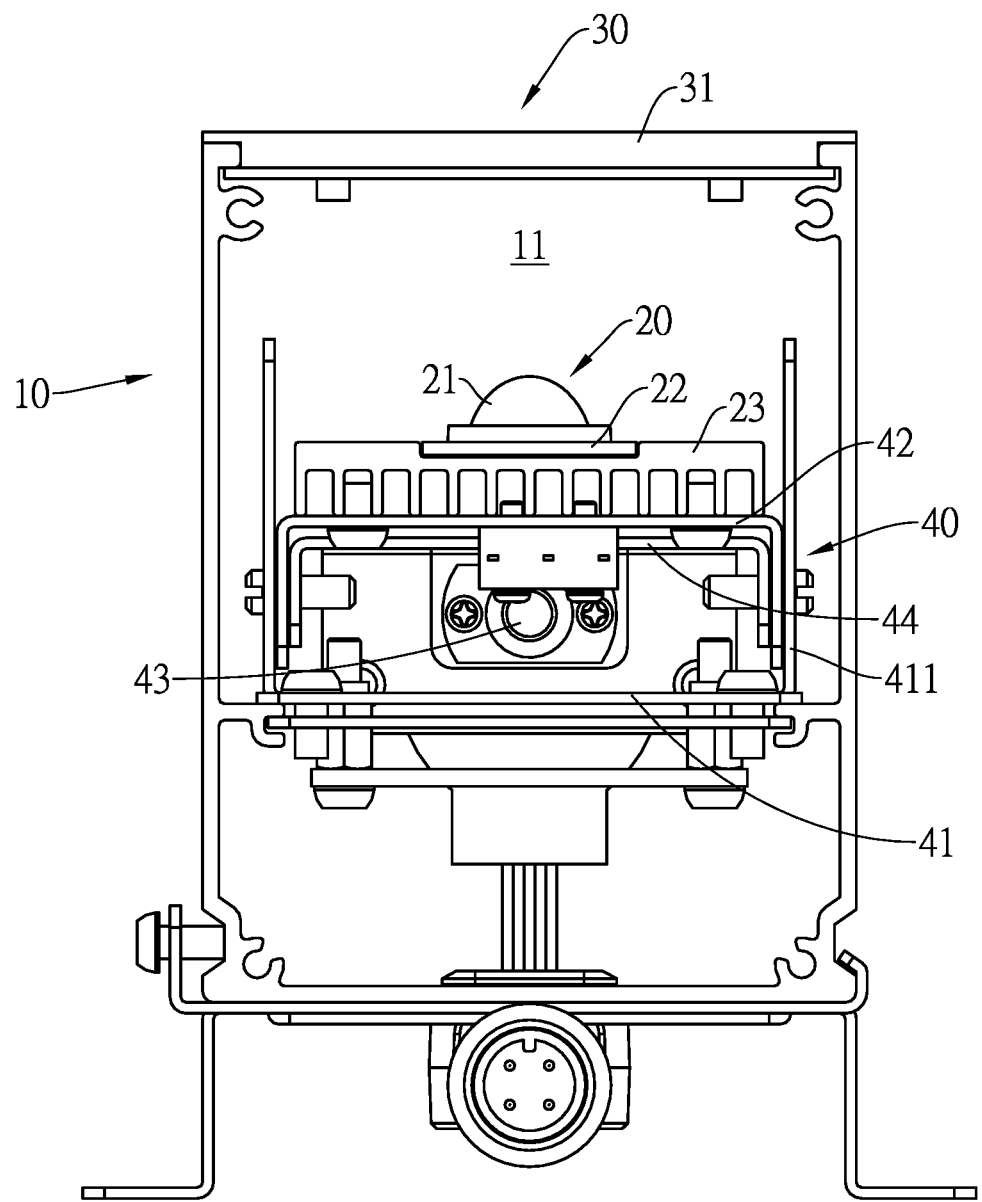
FIG. 6 is a schematic side view of the illuminating device in FIG. 1.

With reference to FIGS. 1, 2 and 6, in a preferred embodiment, the base 10 is a case for accommodating components such as the light source 20 and the position-adjusting device 40. A side of said case has an opening 11 to allow light emitted by the light source 20 to travel away from the base 10. However, a form of the base 10 is not limited to a case. The base 10 can be a plate as long as other components can be mounted on the base 10.

With reference to FIGS. 2, 4, 6 and 13, the light sources 20 are mounted on the base 10. In the preferred embodiment, the light sources 20 are mounted inside the case, and the light sources 20 emit light toward the opening 11 of the case. The light sources 20 are light emitting diodes, and to be precise, various types of light emitting diodes can be adopted, including COB-type (Chip on Board) light emitting diodes with a single color temperature, COB-type light emitting diodes with two color temperatures, a single general type light emitting diode, a group of general type light emitting diodes, a group of general type light emitting diodes having one red light emitting diode or one blue light emitting diode inserted in a center of the group, and a group of general type light emitting diodes having one red light emitting diode and one blue light emitting diode inserted in a center of the group. Red light source and blue light source increase strength of wavelength corresponding to red light and blue light of a light spectrum, which has an efficacy of promoting growth of certain plants. However, the light source 20 is not limited thereto. For example, a number of the light source 20 can be one, and the type of the light source 20 is not limited to light emitting diode.

In the preferred embodiment, each one of the light sources 20 is covered by a near-field lens 21 to converge light. The light source 20 and the near-field lens 21 are mounted on a circuit board 22. The circuit board 22 is mounted on a heat sink 23. In addition, in the preferred embodiment, a brightness of the at least one light source 20 is adjustable, but the at least one light source 20 is not limited thereto.

Figure 3:
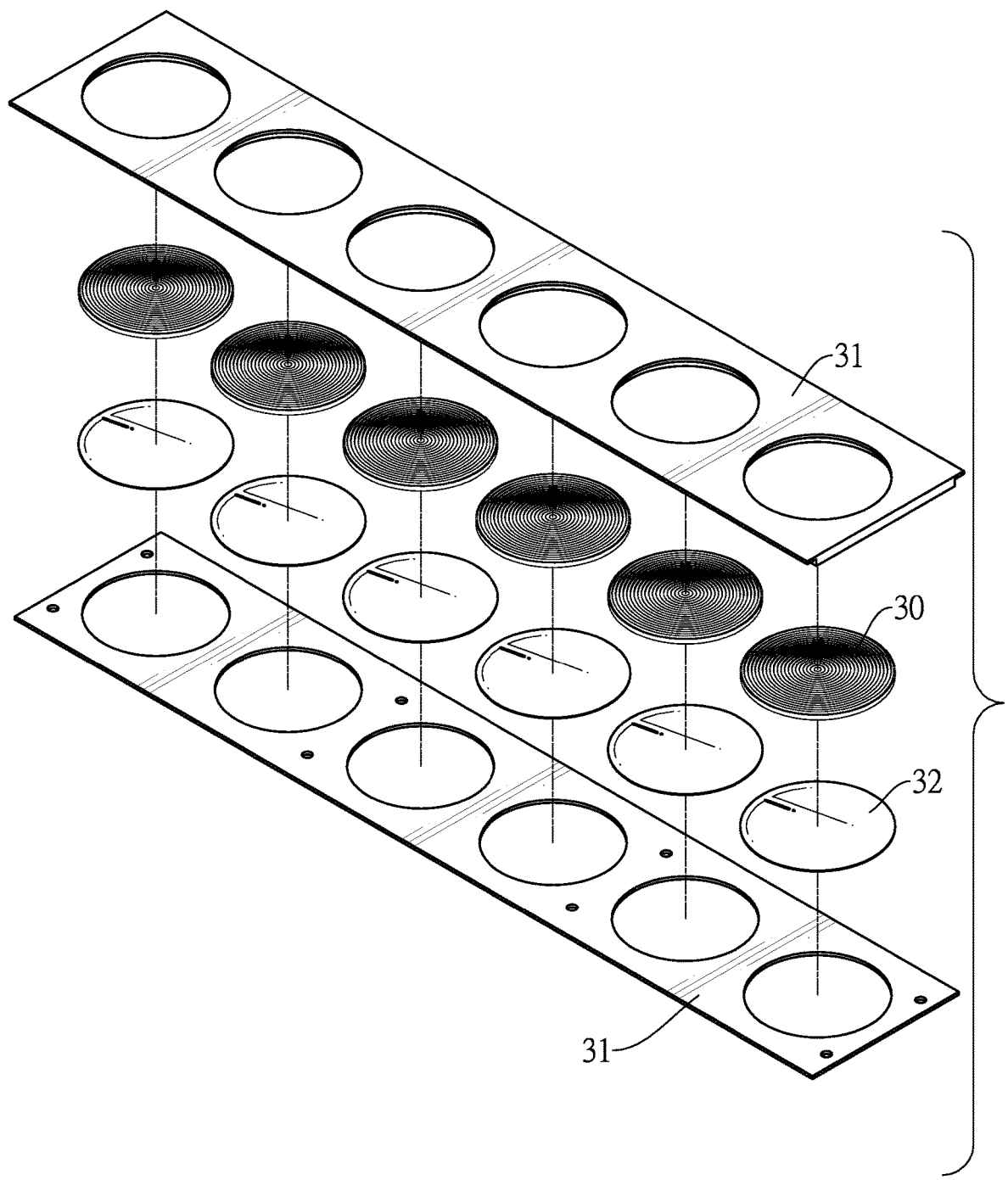
FIG. 3 is an exploded view of light converging plates of the illuminating device in FIG. 1.
Figure 4:
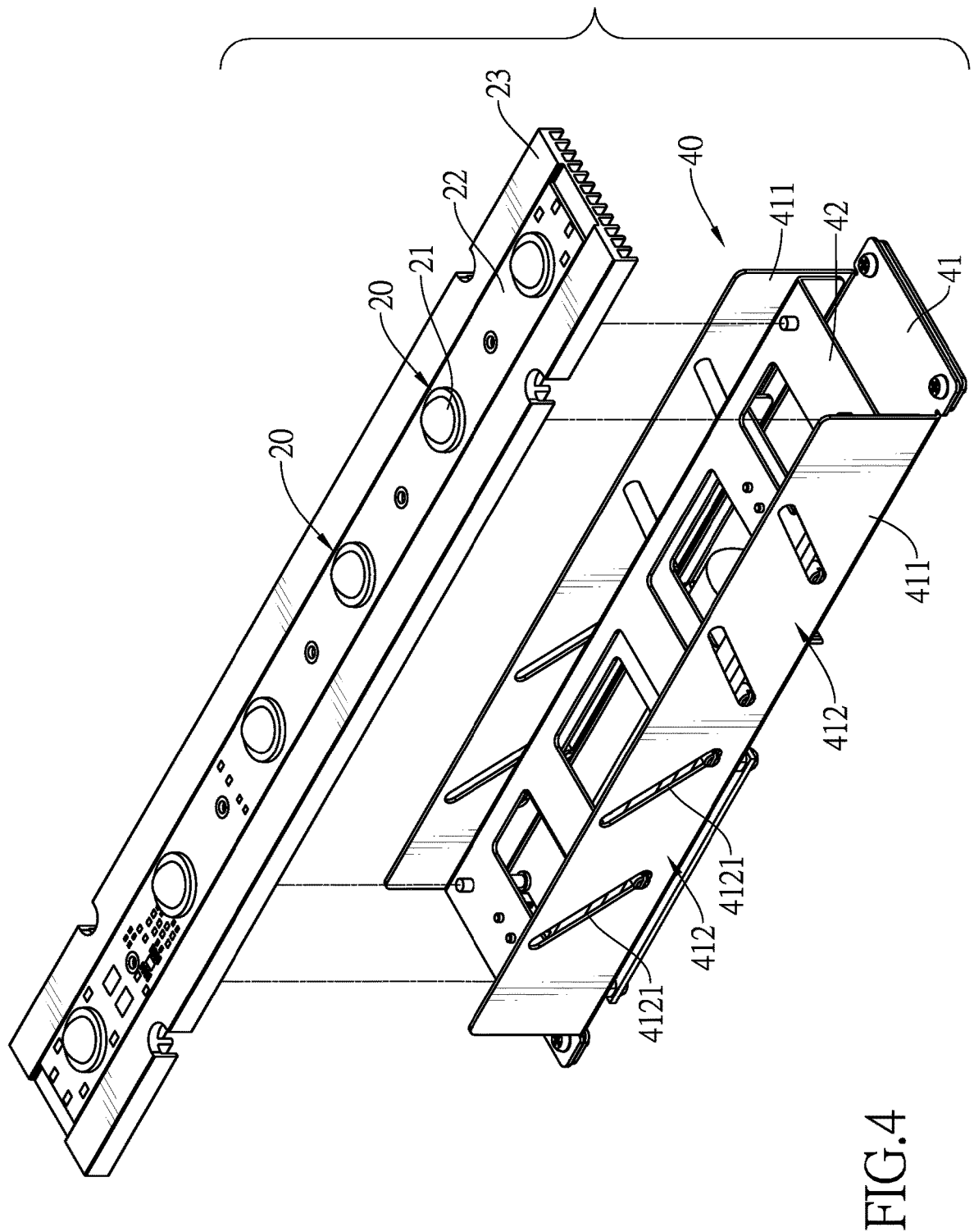
FIG. 4 is an exploded view of light sources and a position-adjusting device of the illuminating device in FIG. 1.
Figure 5:
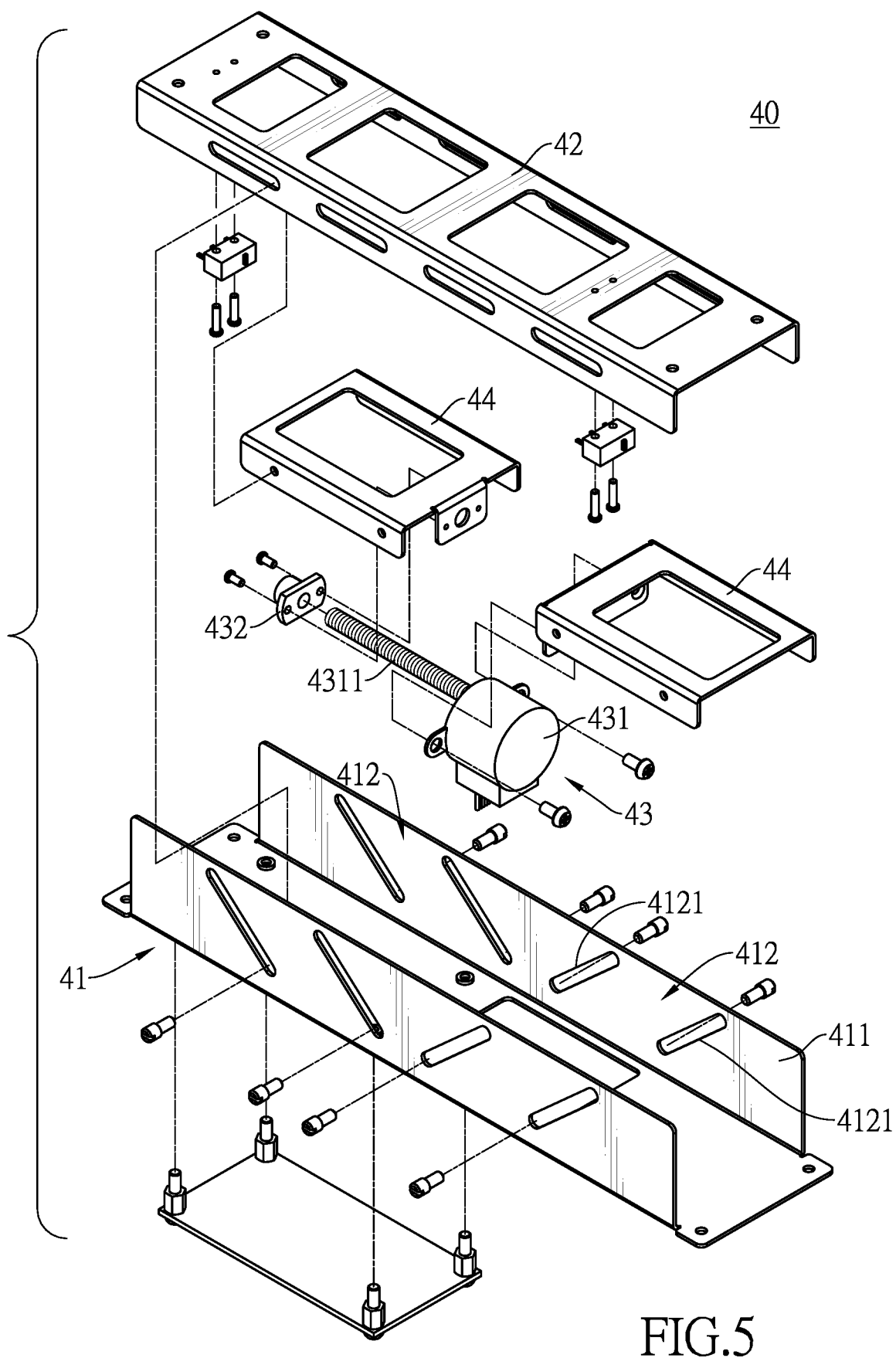
FIG. 5 is an exploded view of the position-adjusting device of the illuminating device in FIG. 1.
Figure 13:
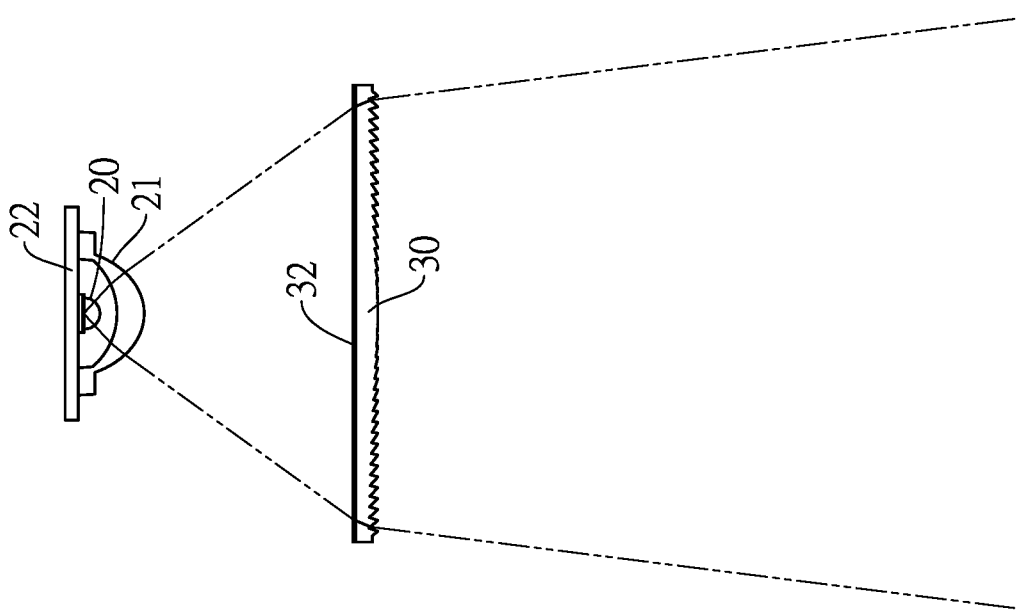

With reference to FIGS. 2, 3 and 13, the light converging plates 30 are mounted on the base 10 and located in optical paths of the light sources 20, and are capable of converging light emitted by the light sources 20. In the preferred embodiment, a number of the light converging plates 30 is equal to a number of the light sources 20, and each one of the light converging plates 30 corresponds to a respective one of the light sources 20. In addition, the light converging plates 30 are mounted between two lens mounts 31. The light converging plates 30 and the lens mounts 31 together close the opening 11 of the case. Besides, each one of the light converging plates 30 is a thin lens, and to be precise, said thin lens is a Fresnel lens. Furthermore, an optical film 32 is mounted on a surface, which faces toward the corresponding light source 20, of each one of the light converging plates 30. The optical film 32 is a film which is capable of slightly diffusing light, and is therefore capable of distributing light, such that light generates a uniformly distributed illumination.

With reference to FIGS. 4 to 8, the position-adjusting device 40 is connected to the light sources 20 or the light converging plates 30, and is capable of changing a distance between the light sources 20 and the light converging plates 30.

The position-adjusting device 40 has multiple configurations. In a first preferred embodiment of the present invention, the position-adjusting device 40 is mounted on the base 10, and moves the light sources 20 relative to the base 10 to change the distances between the light sources 20 and the light converging plates 30. However, the position-adjusting device 40 is not limited thereto. For example, the position-adjusting device 40 can be mounted on the base 10 and moves the light converging plates 30, or the position-adjusting device 40 can be mounted directly between the light sources 20 and the light converging plates 30 to move the light sources 20 or the light converging plates 30.

In the preferred embodiment, the position-adjusting device 40 comprises a fixing frame 41, two moving seats 44, a moving frame 42 and a power source 43.

The fixing frame 41 is mounted on the base 10. Two standing plates 411 are mounted on the fixing frame 41. Two inclined guiding hole sets 412 are formed on the fixing frame 41. Each one of the inclined guiding hole sets 412 has multiple inclined guiding holes 4121. The inclined guiding holes 4121 are formed on the two standing plates 411. Each one of the inclined guiding holes 4121 is an elongated hole extending obliquely relative to a direction in which the light sources 20 emit light. The inclined guiding holes 4121 of one of the two inclined guiding hole sets 412 are disposed symmetrically to the inclined guiding holes 4121 of the other inclined guiding hole set 412.

The two moving seats 44 are movably mounted on the fixing frame 41, mounted between the two standing plates 411, and mounted through the inclined guiding holes 4121 of the two inclined guiding hole sets 412. Two opposite sides of each one of the moving seats 44 are mounted through the inclined guiding holes 4121 of the two standing plates 411 respectively, and to be precise, each said side of the moving seats 44 is mounted through the inclined mounting holes 4121 belonging to one of the two guiding hole sets 412. The moving seats 44 are movable along the inclined guiding holes 4121.

The light sources 20, the circuit board 22 and the heat sink 23 are mounted on the moving frame 42. The two moving seats 44 are movably connected to the moving frame 42, and are transversely movable.

Figure 7:
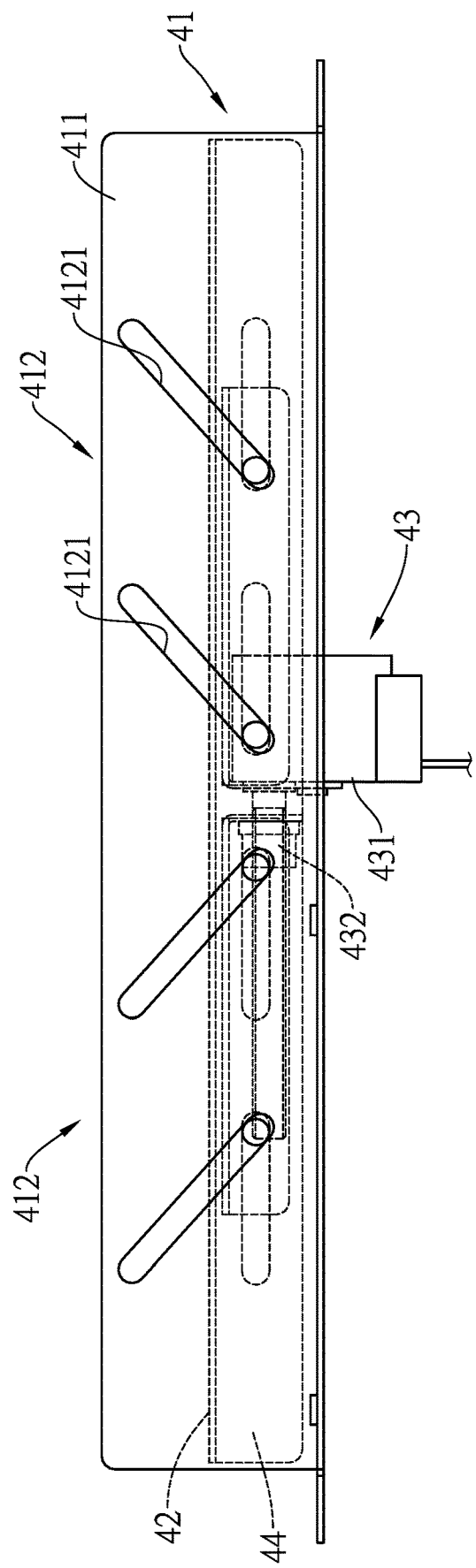
FIGS. 7 and 8 are front views of a first configuration of the position-adjusting device of the illuminating device in FIG. 1, showing different operating statuses of the present invention.
Figure 8:
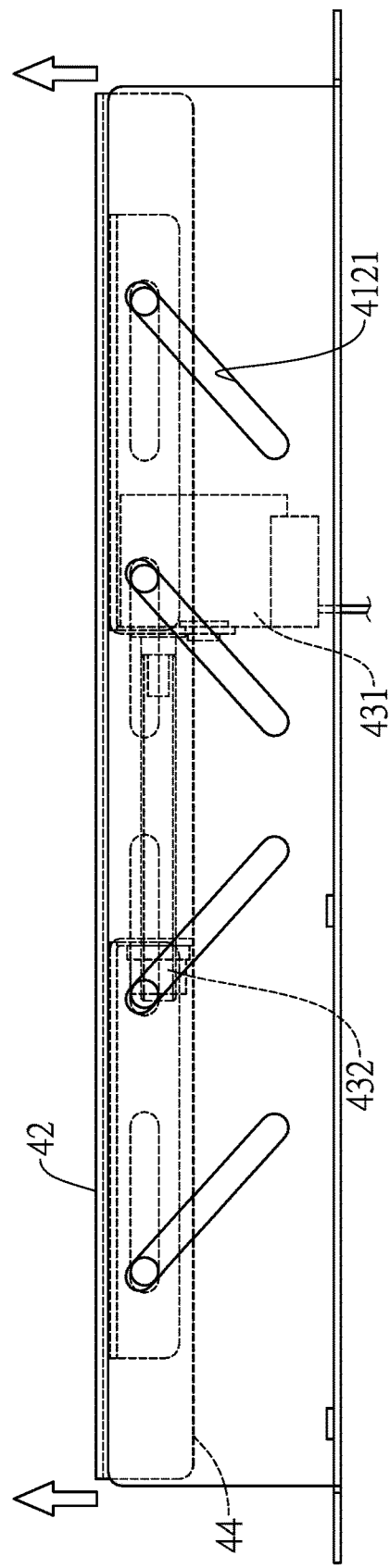

The power source 43 connects the two moving seats 44, and is capable of moving the two moving seats 44 linearly to increase or decrease a distance between the two moving seats 44. The power source 43 has multiple configurations. In the preferred embodiment, the power source 43 comprises a motor 431 and a nut 432. The motor 431 has a rotatable output shaft 4311. The nut 432 is mounted around and screwed onto the output shaft 4311. The motor 431 and the nut 432 are mounted on the two moving seats 44 respectively, such that by rotating the output shaft 4311, the distance between the two moving seats 44 can be increased or decreased, thereby making the moving seats 44 move obliquely along the inclined guiding holes 4121, and further making the moving seats 44 move toward or away from the fixing frame 41 (as shown in FIGS. 7 and 8). As a result, the moving frame 42 mounted on the moving seat 44 together with the light source 20 mounted on the moving frame 42 move toward or away from the light converging plate 30 when the output shaft 4311 rotates.

Figure 17:
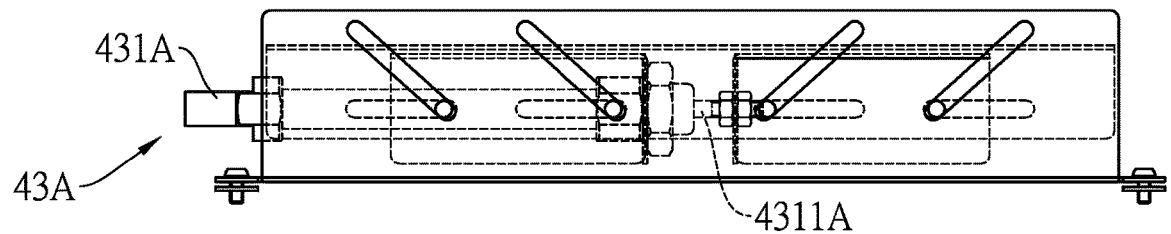
FIG. 17 and FIG. 18 are front views of a second embodiment in accordance with the present invention, showing different operating statuses of the position-adjusting device of the present invention.
Figure 18:
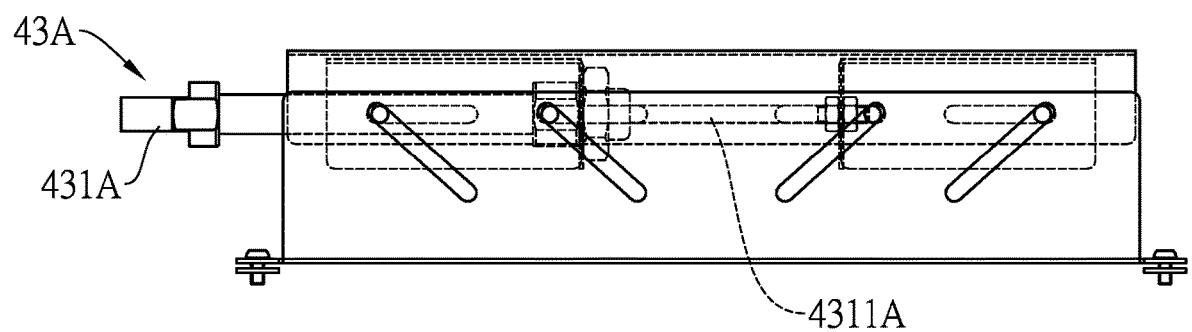

Besides, with reference to FIGS. 17 and 18, in a second embodiment in accordance with the present invention, the power source 43A comprises a driving cylinder 431A. A driving rod 4311A protrudes from the driving cylinder431A, and is linearly movable. An end of a main body of the driving cylinder 431A and an end of the driving rod 4311A are connected to the two moving seats 44 respectively. As a result, the power source 43A can change the distance between the two moving seats 44 to achieve the same objective as mentioned above.

With reference to FIGS. 12 to 16, the distance sensor 50 faces toward the direction in which the light sources 20 emit light, and detects a distance between an external object and the distance sensor 50. The distance sensor 50 is electrically connected to the position-adjusting device 40 and the light sources 20, and adjusts the distance between the light sources 20 and the light converging plates 30 according to the distance, which is detected by the distance sensor 50, between the external object and the distance sensor 50. Meanwhile, a brightness of the light sources 20 is also adjusted by the distance sensor 50 according to said distance. The distance sensor can be mounted on the base 10 or mounted next to the base 10, as long as the distance sensor 50 and the base 10 are located on the same imaginary plane. The distance sensor 50 can be a supersonic sensor, an infrared light sensor or a sensor that works based on image interpretation.

Figure 9:
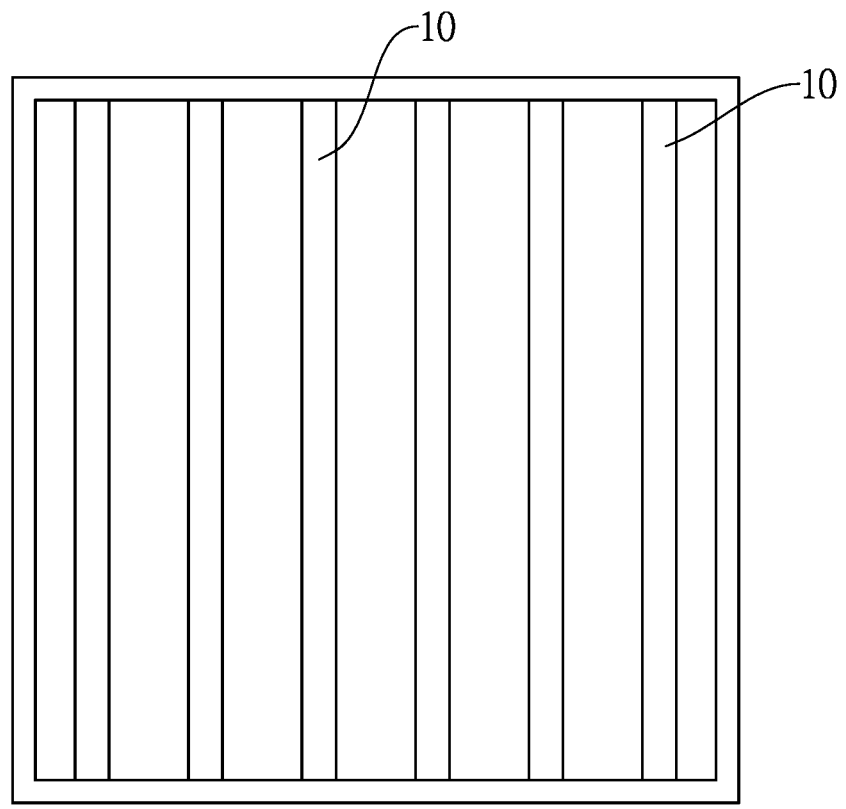
FIG. 9 is a schematic top view of an illuminating unit made up of a plurality of the illuminating devices of the present invention, and corresponding to a single cultivation frame.

With reference to FIG. 9, a shape of the present invention can be elongated, such that the light sources 20 and the light converging plates 30 are arranged along an imaginary straight line, and then a plurality of the illuminating devices of the present invention are disposed apart from each other to form an illuminating unit which illuminates a cultivation frame. A distance sensor 50 can be shared by the components of one said illuminating unit. Besides, with reference to FIG. 10, multiple said illuminating units can be serially connected to illuminate multiple said cultivation frames. With reference to FIG. 11, moreover, the light sources 20, the light converging plates 30 and the position-adjusting device 40 can be combined to one piece to form an illuminating module. A plurality of the illuminating modules can be mounted on a single base 10, i.e., case, to increase an illumination field.

Figure 14:
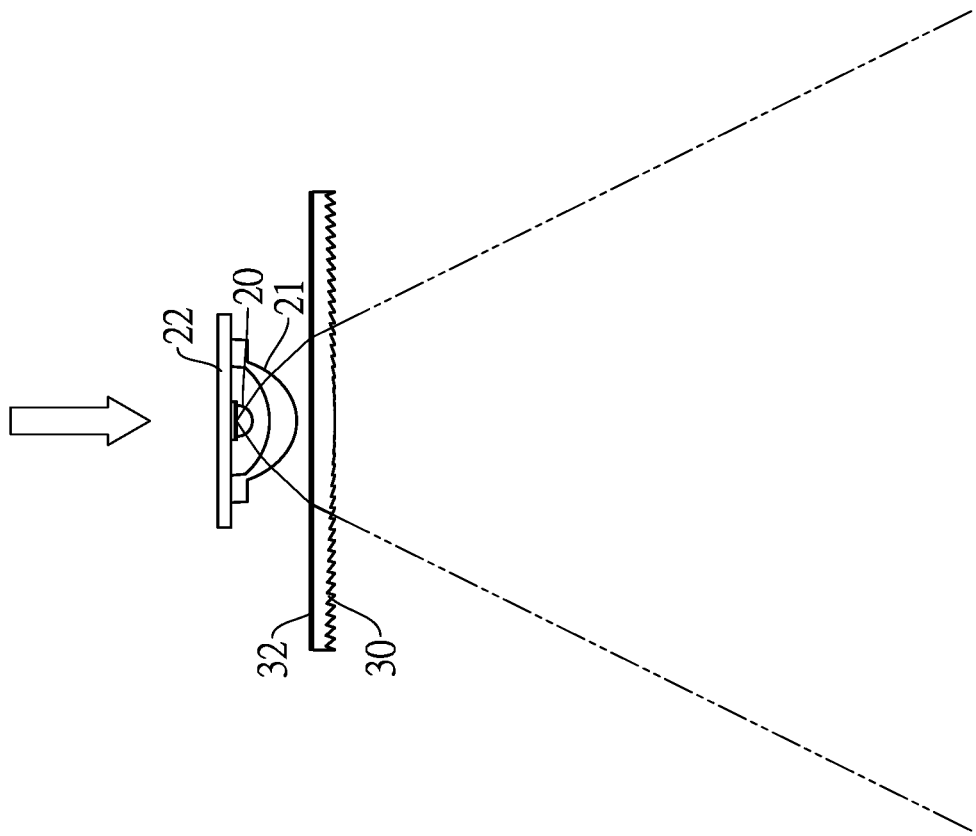
FIG. 13 and FIG. 14 are side views of the illuminating device in FIG. 1, showing light distribution angle of the light source altered differently by the light converging plate.
Figure 16:
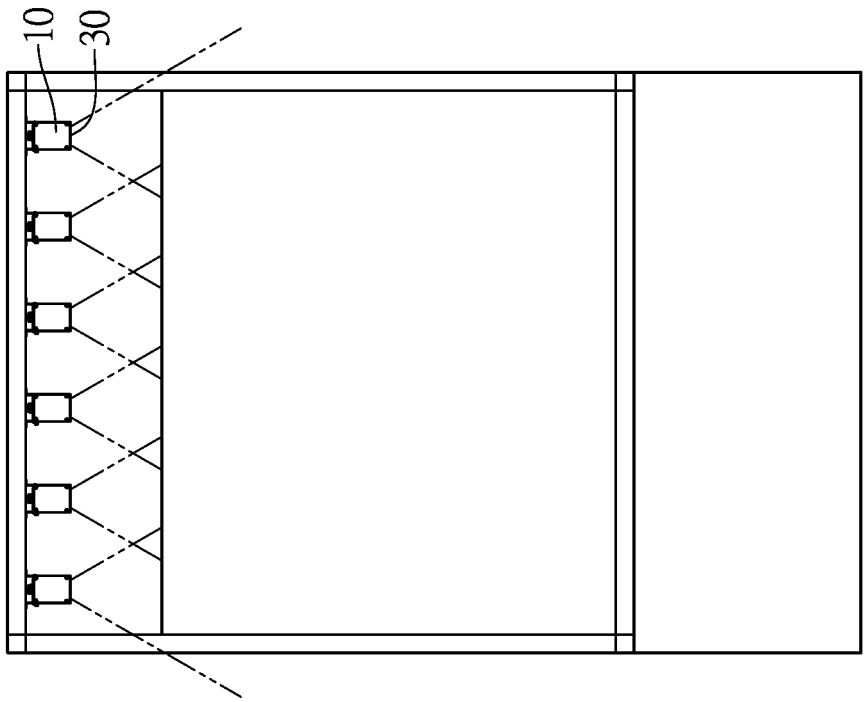
FIG. 15 and FIG. 16 are side views of a plurality of the illuminating devices of the present invention, showing light distribution angles under different operating statuses.
Figure 15:
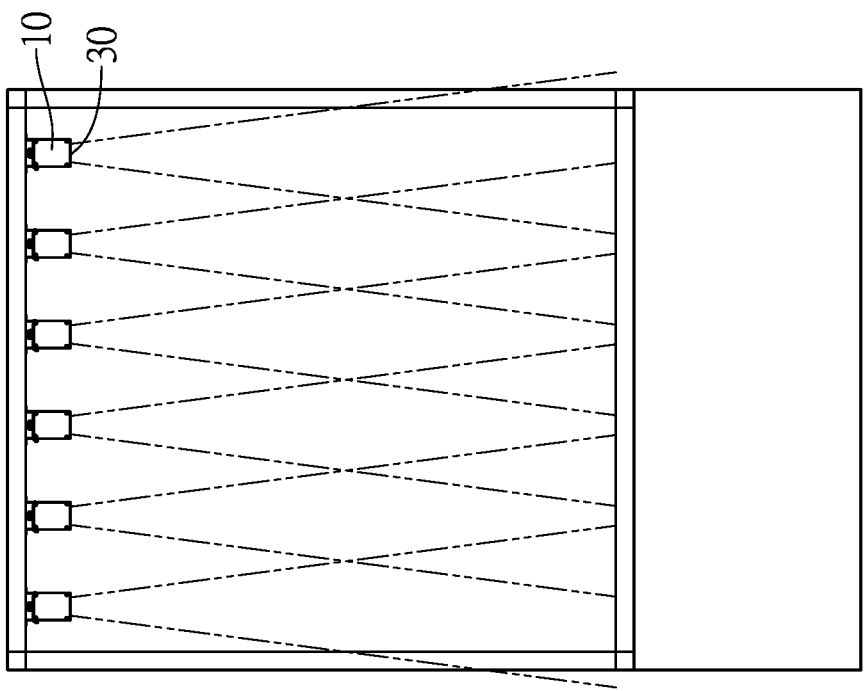

With reference to FIGS. 12 to 16, the present invention is mounted above the plants when in use. The light sources 20 face toward the plants, and the distance sensor 50 detects a position of top ends of the plants. To illuminate newly sowed plants (as shown in FIG. 15) at a distance of 1.2 meters, the present invention illuminates at a light distribution angle of 15 degrees (as shown in FIG. 13), and an luminance on top ends of the plants is controlled and maintained above 9000 lux. As the plants grow, the top ends of the plants move upward and reduce an illuminating distance (as shown in FIG. 16), and the position-adjusting device 40 makes the light converging plate 30 move upward to reduce the distance between the light converging plate 30 and the light source 20, thereby increasing the illuminating field, e.g., increasing the light distribution angle, as shown in FIG. 14. Meanwhile, the brightness of the light source 20 is gradually reduced to steadily maintain the luminance on the top ends of the plants above 9000 lux. Finally, the light distribution angle is set at 60 degrees when the illuminating distance is reduced to 0.2 meter.

TABLE 1 single cultivation frame (as shown in FIG. 9)

| | conventional illuminating device (light distribution angle at 120 degrees) | | present invention (light distribution angle at 15 degrees) | present invention (light distribution angle at 60 degrees) |
|---|---|---|---|---|
| total brightness of 6 devices (lm) | 15300 × 6 = 91800 | | 131 × 24 × 6 = 18864 | 218 × 24 × 6 = 31392 |
| total consumption of 6 devices 6 (w) | 200 × 6 = 1200 | | 65 × 6 = 390 | 65 × 6 = 390 |
| illuminating distance(m) | 1.2 | 0.2 | 1.2 | 0.2 |
| luminous flux on cultivation frame on 1.2 m * 1.2 m area (lm) | 19305 | 69998 | 16364 | 27409 |
| Maximum luminance on 1.2 m * 1.2 m area (lux) | 17221 | 62786 | 14130 | 22419 |

TABLE 1-continued single cultivation frame (as shown in FIG. 9)

|  | conventional illuminating device (light distribution angle at 120 degrees) | present invention (light distribution angle at 15 degrees) | present invention (light distribution angle at 60 degrees) |
| --- | --- | --- | --- |
| mean luminance on 1.2 m * 1.2 m area (lux) | 13406 | 48610 | 11364 | 19034 |
| light energy use efficiency | 21% | 76.2% | 86.7% | 87.3% |

Figure 10:
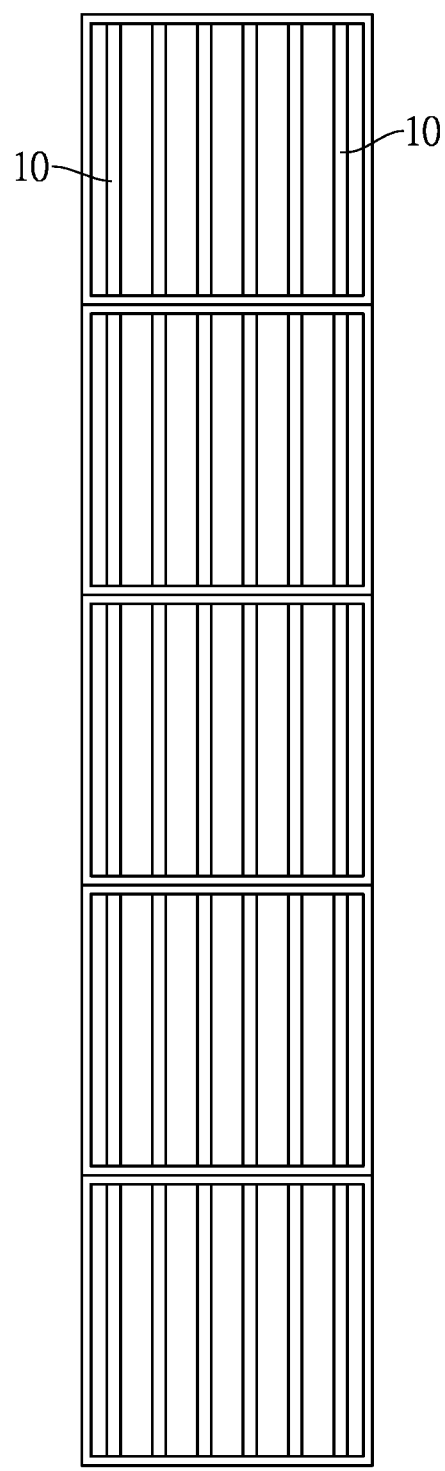
FIG. 10 is a schematic top view of a plurality of the illuminating units in FIG. 9, corresponding to serially connected cultivation frames.
Figure 11:
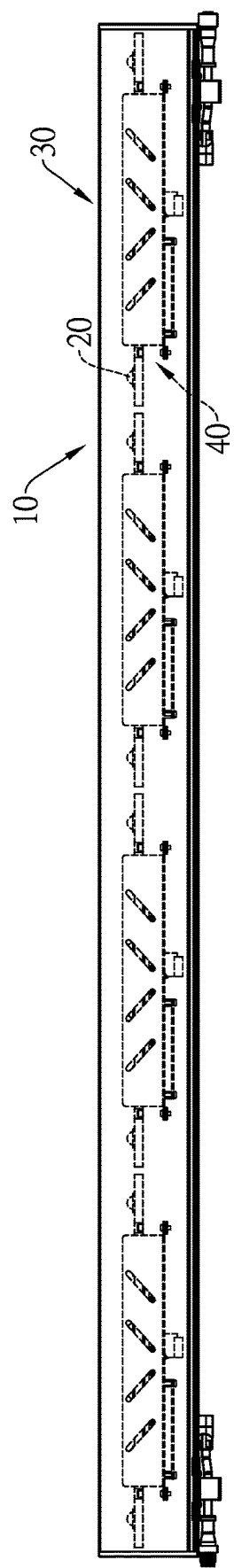
FIG. 11 is a schematic front view of multiple illuminating modules mounted inside a case in accordance with the present invention.

TABLE 2 five serially connected cultivation frames (as shown in FIG. 10)

|  | conventional illuminating device (light distribution angle at 120 degrees) | present invention (light distribution angle at 15 degrees) | present invention (light distribution angle at 60 degrees) |
| --- | --- | --- | --- |
| total brightness of 30 devices (lm) | 15300 × 6 × 5 = 459000 | 131 × 24 × 6 × 5 = 94320 | 218 × 24 × 6 × 5 = 156960 |
| total consumption of 30 devices 6 (w) | 200 × 6 × 5 = 6000 | 65 × 6× 5 = 1950 | 65 × 6 × 5 = 1950 |
| illuminating distance(m) | 1.2    0.2 | 1.2 | 0.2 |
| luminous flux on cultivation frame on 1.2 m * 1.2 m area (lm) | 186340  408063 | 82820 | 139045 |
| maximum luminance on 1.2 m * 1.2 m area (lux) | 30171   66223 | 14056 | 22580 |
| Mean luminance on 1.2 m * 1.2 m area (lux) | 22396   49041 | 10742 | 17366.9 |
| light energy use efficiency | 40.6%   88.9% | 87.8% | 88.5% |

Data comparison in Table 1 is based on a single cultivation frame. In practice, cultivation frames are often serially connected to from a row, as shown in Table 2. When cultivation frames form a row, light scattered from one cultivation frame still illuminates the adjacent cultivation frames. Therefore, for the conventional devices, the utilization efficiency of light energy of serially connected cultivation frames (40.6%) is higher than the utilization efficiency of light energy of a single cultivation frame (21%) when the illuminating distance is longer (1.2 meters). However, even for serially connected cultivation frames, the utilization efficiency of light energy of the conventional device is still far lower than the utilization efficiency of light energy of the present invention (87.8%), and the utilization efficiency of light energy of the serially connected conventional devices is even far lower than the utilization efficiency of light energy of one single cultivation frame of the present invention (86.7%). Although when the illuminating distance is shorter (0.2 m), a difference of utilization efficiency of light energy between the conventional device and the present invention is insignificant, the present invention requires lower brightness and consumes lower watts to achieve same efficacy.

In summary, the brightness and the illumination field are adjusted according to the detected height position of the plants. As a result, the light energy can be used sufficiently and effectively, thereby reducing electricity consumption while maintaining the luminance on the plant at required level.

Figure 20:
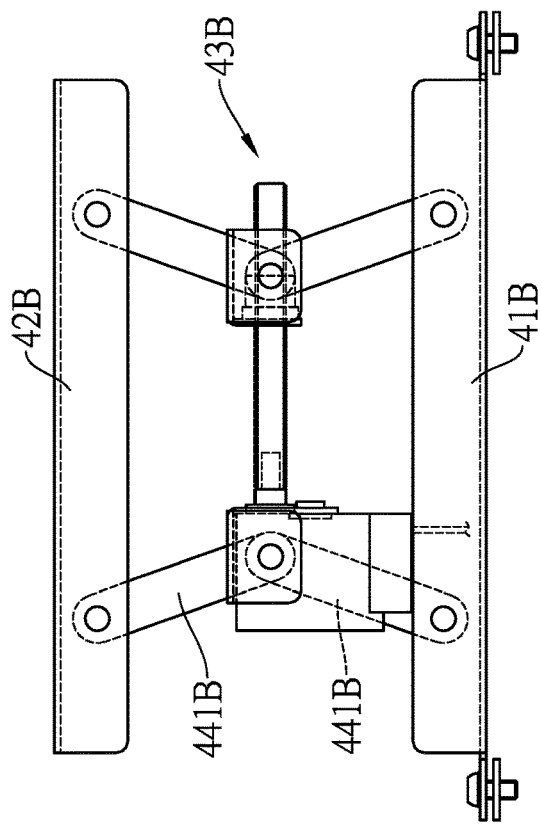
FIG. 19 and FIG. 20 are front views of a third embodiment in accordance with the present invention, showing different operating statuses of the position-adjusting device of the present invention.
Figure 19:
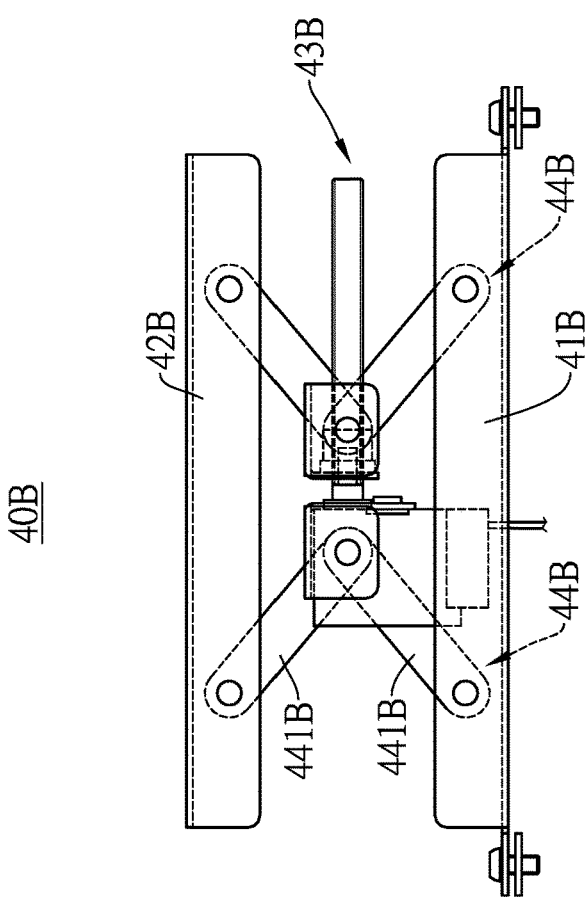

With reference to FIGS. 19 and 20, a third embodiment in accordance with the present invention is substantially similar to the first embodiment mentioned above, but the difference is that two linkages 44B are mounted between the fixing frame 41B of the position-adjusting device 40B and the moving frame 42B instead. Each one of the linkages 44B comprises two linking rods 441B. Each one of the linking rods 441B comprises an outer end and an inner end. The outer ends of the two linking rods 441B are pivotally connected to the fixing frame 41B and the moving frame 42B respectively. The inner ends of the two linking rods 441B are pivotally connected with each other. The power source 43B connects the inner ends of the linking rods 441B of the two linkages 44B instead, and is capable of moving the inner ends of the linking rods 441B of the two linkages 44B linearly to increase or decrease a distance between the inner ends of the linking rods 441B of the two linkages 44B, and thereby changing an angle of the linking rods 441B to increase or decrease a distance between the fixing frame 41B and the moving frame 42B. Besides, the power source 43B in the third embodiment is a motor.

Figure 21:
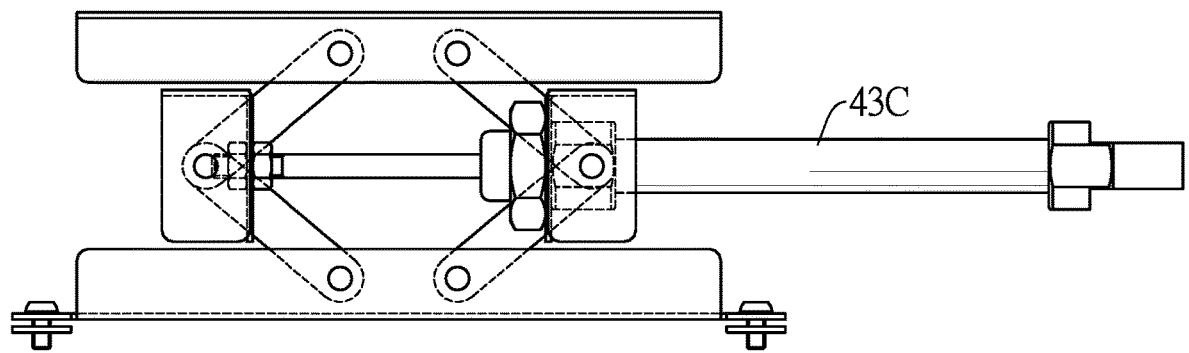
FIG. 21 and FIG. 22 are front views of a fourth embodiment in accordance with the present invention, showing different operating statuses of the position-adjusting device of the present invention.
Figure 22:
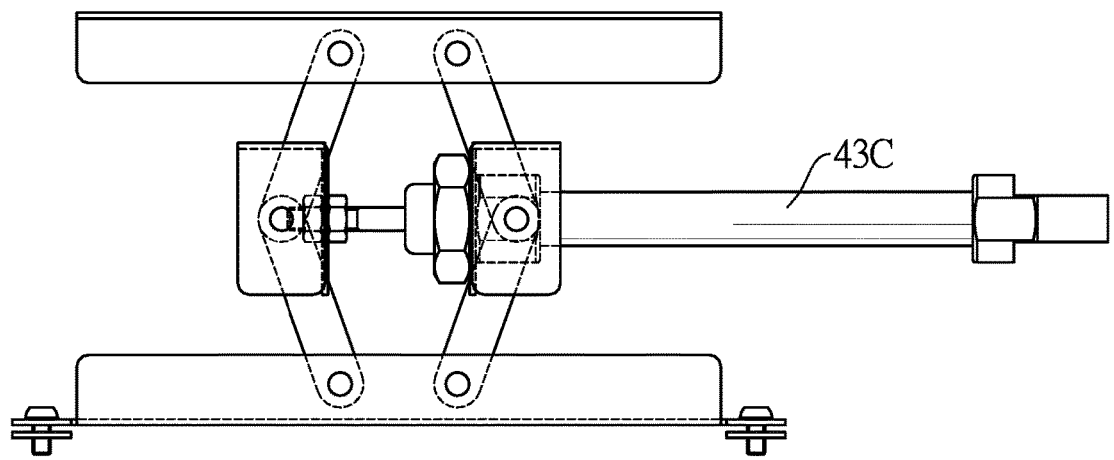

With reference to FIGS. 21 and 22, a fourth embodiment in accordance with the present invention is substantially similar to the third embodiment mentioned above, but the difference is that the power source 43C is a driving cylinder.

Figure 23:
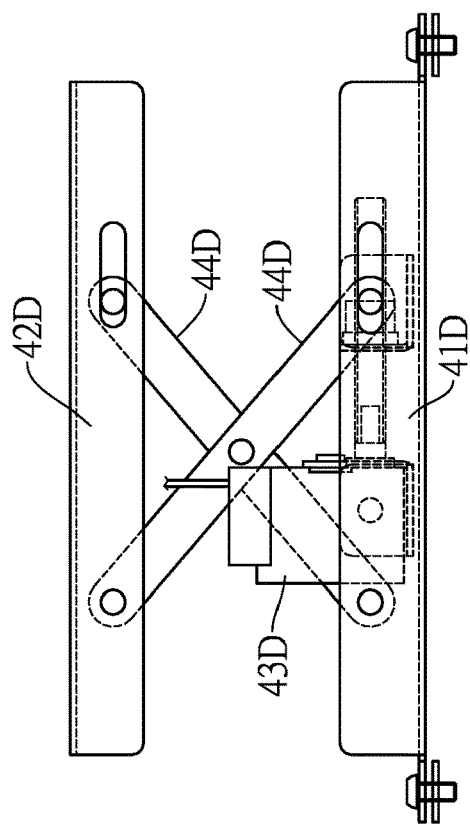
FIG. 23 and FIG. 24 are front views of a fifth embodiment in accordance with the present invention, showing different operating statuses of the position-adjusting device of the present invention.
Figure 24:
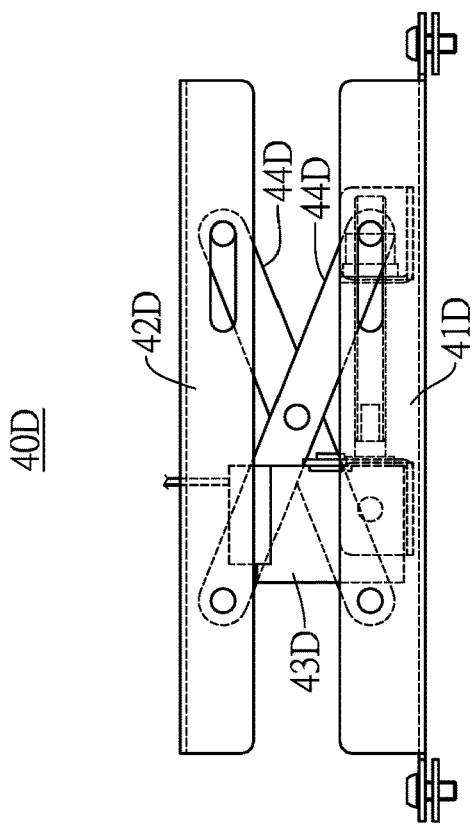

With reference to FIGS. 23 and 24, a fifth embodiment in accordance with the present invention is substantially similar to the first embodiment mentioned above, but the difference is that the position-adjusting device 40D in the fifth embodiment has two linking rods 44D mounted between the fixing frame 41D and the moving frame 42D instead. A middle of the two linking rods 44D are pivotally connected with each other. Each one of the linking rods 44D comprises a fixing end and a moving end. The fixing end of the two linking rods 44D are pivotally connected to the fixing frame 41D and the moving frame 42D respectively. The moving ends of the two linking rods 44D are pivotally connected to the fixing frame 41D and the moving frame 42D respectively, and the moving ends of the two linking rods 44D are movable relative to the fixing frame 41D and the moving frame 42D respectively. The power source 43 is capable of moving the moving ends of one of the two linking rods 44D to increase or decrease a distance between the power source 43D and said moving end, that is, the power source 43D can be fixed on the fixing frame 41D or the moving frame 42D, and moves the moving end of the linking rod 44D corresponding to the moving frame 42D or the fixing frame 41D toward or away from the power source 43D. By doing so, an angle between the two linking rods 44D can be changed as well, which in turn moves the moving frame 42D toward or away from the fixing frame 41D. Moreover, in the preferred embodiment, the power source 43D is a motor, but the power source 43D can be substituted by a driving cylinder.

Figure 25:
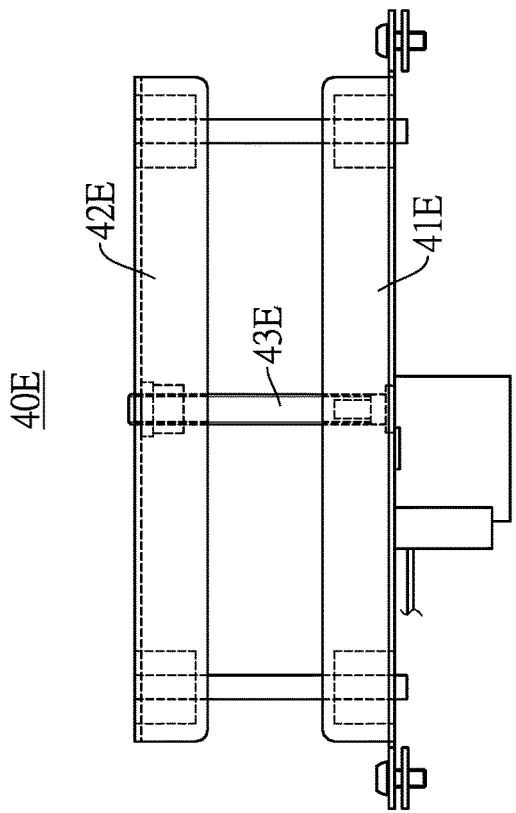
FIG. 25 is a schematic front view of a sixth embodiment in accordance with the present invention.

With reference to FIG. 25, a sixth embodiment in accordance with the present invention is substantially similar to the first embodiment mentioned above, but the difference is that the fixing frame 41E and the moving frame 42E of the position-adjusting device 40E are directly moved by the power source 43E to increase or to decrease a distance between the fixing frame 41E and the moving frame 42E. Additionally, in the preferred embodiment, the power source 43E is a motor.

Figure 26:
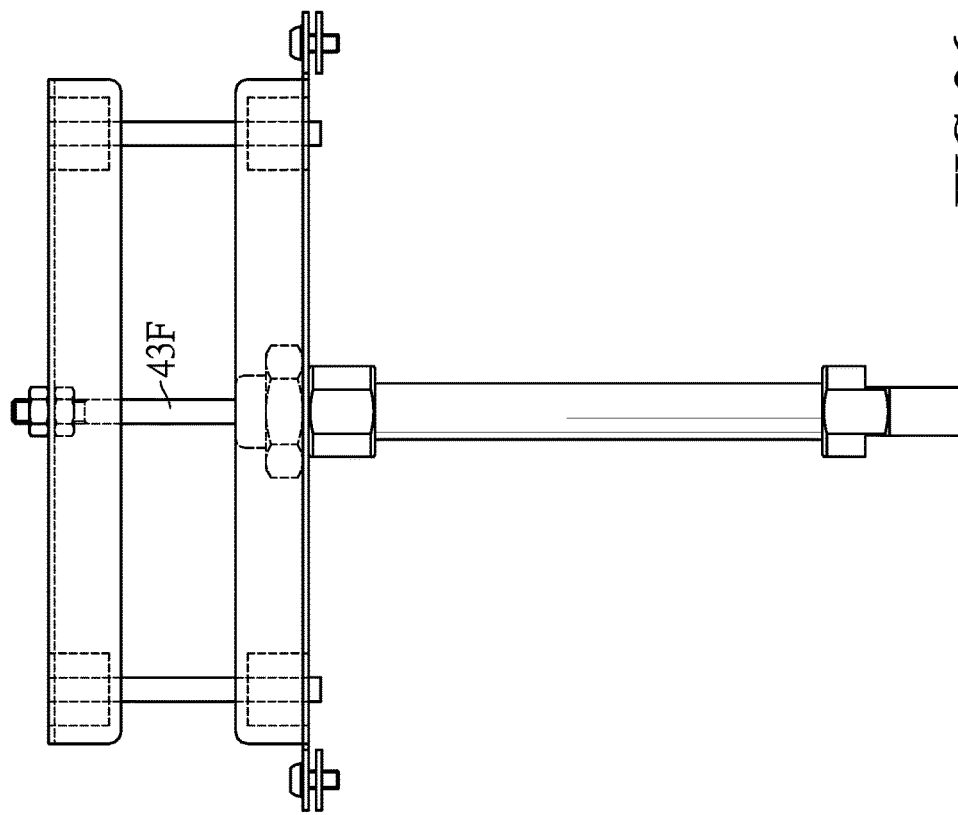
FIG. 26 is a schematic front view of a seventh embodiment in accordance with the present invention.

With reference to FIG. 26, a seventh embodiment in accordance with the present invention is substantially similar to the sixth embodiment mentioned above, but the difference is that the power source 43F of the seventh embodiment is a driving cylinder.

Figure 27:
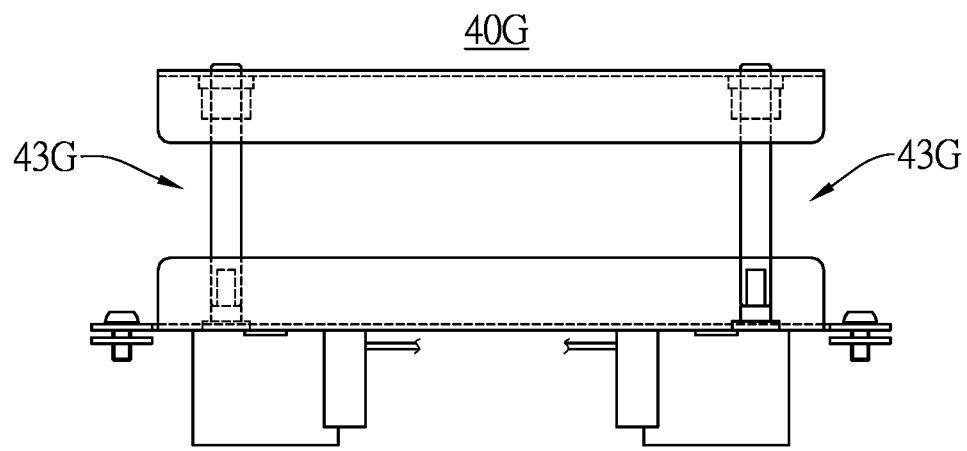
FIG. 27 is a schematic front view of an eighth embodiment in accordance with the present invention.

With reference to FIG. 27, an eighth embodiment in accordance with the present invention is substantially similar to the sixth embodiment mentioned above, but the difference is that the position-adjusting device 40G of the eighth embodiment has two power sources 43G.

Figure 28:
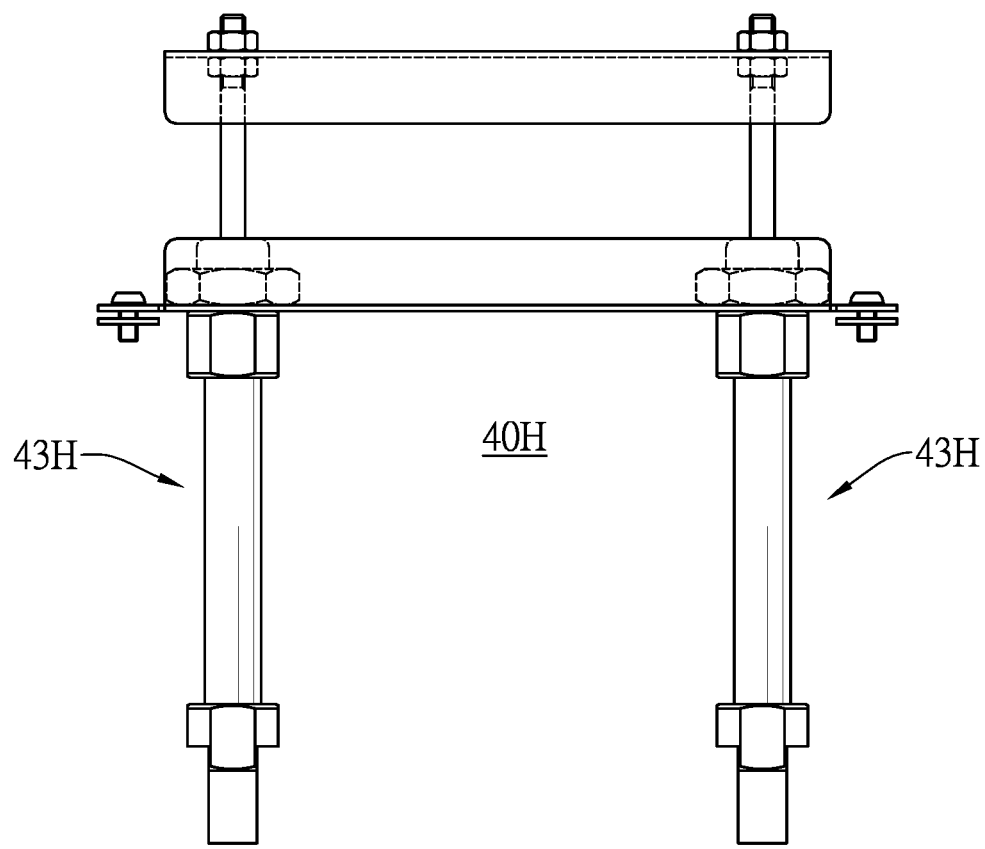
FIG. 28 is a schematic front view of a ninth embodiment in accordance with the present invention.
Figure 29:
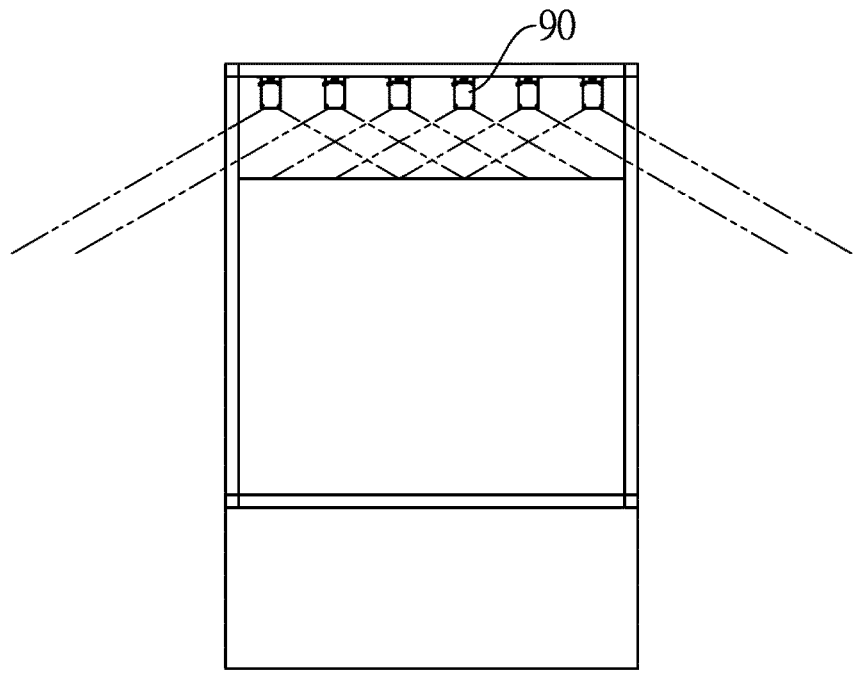
FIG. 29 and FIG. 30 are side views of multiple conventional illuminating devices using light, showing light distribution angles under different operating statuses.
Figure 30:
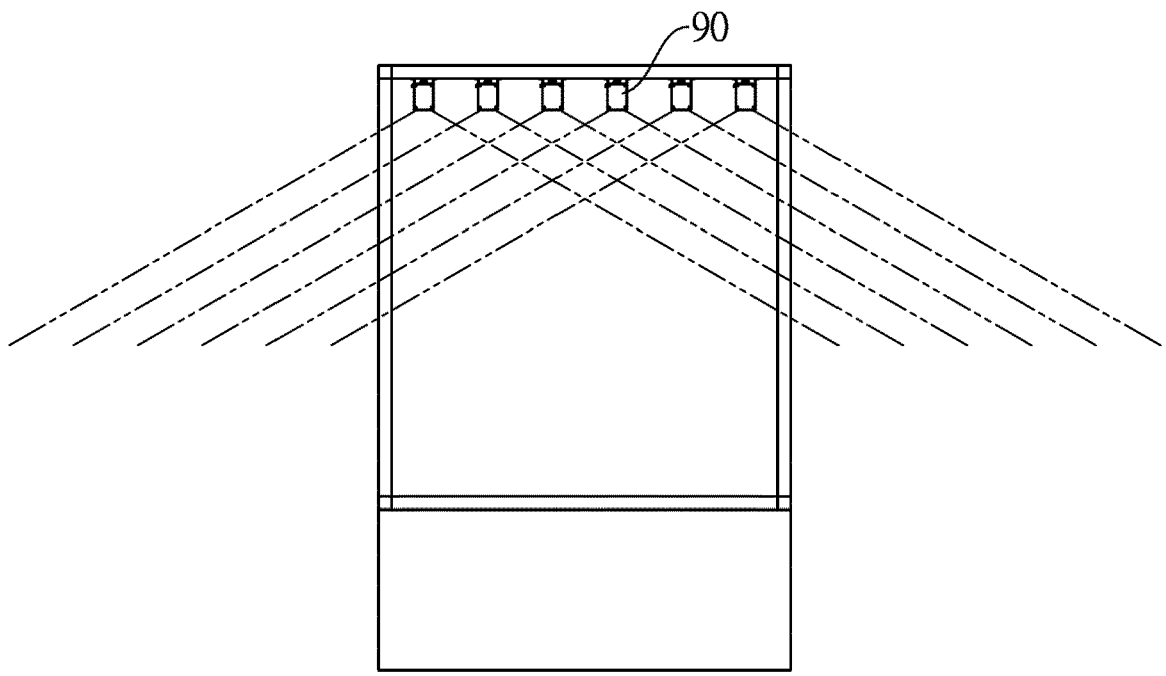

With reference to FIG. 28, a ninth embodiment in accordance with the present invention is substantially similar to the seventh embodiment mentioned above, but the difference is that the position-adjusting device 40H of the ninth embodiment has two power sources 43H.

Besides, the near-field lens 21 in front of the light source 20 is not necessary to the present invention. Light emitting diodes used in conjunction with the Fresnel lens (light converging plate 30) is sufficient for changing the light distribution angle. However, a diameter of the Fresnel lens is restricted, and therefore when adopting a light emitting diode with a light distribution angle of 120 degrees, much of the light emitted by the light emitting diode could not travel away from the present invention when the light distribution angle of the present invention is set at a small angle, which reduces the utilization efficiency of light energy. With the assistance from the near-field lens 21, more light emitted by the light emitting diode is converged toward the Fresnel lens, thereby improving the light energy use efficiency.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An illuminating device for plant cultivation comprising:
   a base;
   at least one light source mounted on the base and emitting light in a direction of a growing plant;
   at least one light converging plate mounted on the base and located in an optical path of the at least one light source, and being configured to converge the light emitted by the at least one light source;
   a position-adjusting device mounted on the base and being connected to the at least one light source or the at least one light converging plate and being configured to change a distance between the at least one light source and the at least one light converging plate; the position-adjusting device moving the at least one light source or the at least one light converging plate relative to the base and thereby change the distance between the at least one light source and the at least one light converging plate, wherein an illumination field of the illuminating device is altered;
   a distance sensor facing toward the direction in which the light is emitted from the at least one light source, and detecting a distance between a growing plant and the distance sensor; the distance sensor being electrically connected to the position-adjusting device, the position-adjusting device changing the distance between the at least one light source and the at least one light converging plate responsive to the detected distance between the growing plant and the distance sensor such that the illumination field of the illuminating device increases in correspondence with the detected distance being reduced as the growing plant grows higher.

2. The illuminating device as claimed in claim 1, wherein a brightness of the at least one light source is adjustable;
   the at least one light source is electrically connected to the distance sensor; and
   the distance sensor changes the brightness of the at least one light source according to the distance, which is detected by the distance sensor, between the external object and the distance sensor.

3. The illuminating device as claimed in claim 1, wherein each of the at least one light converging plate is a thin lens.

4. The illuminating device as claimed in claim 3, wherein at least one optical film is mounted on a surface, which faces towards the at least one light source, of the at least one light converging plate; the at least one optical film diffuses light and is configured to distribute light evenly.

5. The illuminating device as claimed in claim 1, wherein each of the at least one light converging plate is a Fresnel lens.

6. The illuminating device as claimed in claim 1, wherein the at least one light source is covered by a near-field lens.

7. The illuminating device as claimed in claim 1, wherein the at least one light source is mounted on a heat sink.

8. The illuminating device as claimed in claim 1, wherein each of the at least one light source is a blue light source or a red light source.

9. The illuminating device as claimed in claim 1, wherein the position-adjusting device comprises:
   a fixing frame mounted on the base and having
      two inclined guiding hole sets formed in the fixing frame; each one of the inclined guiding hole sets having
         multiple inclined guiding holes; each one of the inclined guiding holes being an elongated hole; wherein the inclined guiding holes of one of the two inclined guiding hole sets are disposed symmetrically to the inclined guiding holes of the other inclined guiding hole set;

two moving seats movably mounted on the fixing frame, and mounted through the inclined guiding holes of the two inclined guiding hole sets respectively; each one of the moving seats being movable along the inclined guiding holes of the corresponding inclined guiding hole set;

a power source connecting the two moving seats and being configured to move the two moving seats linearly to increase or decrease a distance between the two moving seats;

a moving frame on which the at least one light source is mounted; the two moving seats movably connected to the moving frame.

10. The illuminating device as claimed in claim 9, wherein the power source comprises:
a motor having a rotatable output shaft; and
a nut mounted around and screwed onto the output shaft.

11. The illuminating device as claimed in claim 9, wherein the power source comprises:
a driving cylinder having
a driving rod protruding from the driving cylinder; the driving rod being linearly movable.

12. The illuminating device as claimed in claim 1, wherein the position-adjusting device comprises:
a fixing frame mounted on the base;
a moving frame on which the at least one light source is mounted;
two linkages mounted between the fixing frame and the moving frame; each one of the linkages comprising
two linking rods; each one of the linking rods comprising
an outer end; and
an inner end; wherein the outer ends of the two linking rods are pivotally connected to the fixing frame and the moving frame respectively; the inner ends of the two linking rods are pivotally connected with each other; and
a power source connecting the inner ends of the linking rods of the two linkages, and being configured to move the inner ends of the linking rods of the two linkages linearly to increase or decrease a distance between the inner ends of the linking rods of the two linkages.

13. The illuminating device as claimed in claim 1, wherein the position-adjusting device comprises:
a fixing frame mounted on the base;
a moving frame on which the at least one light source is mounted;
two linking rods mounted between the fixing frame and the moving frame, and pivotally connected with each other; each one of the linking rods comprising
a fixing end; and
a moving end; wherein the fixing ends of the two linking rods are pivotally connected to the fixing frame and the moving frame respectively; the moving ends of the two linking rods are pivotally connected to the fixing frame and the moving frame respectively, and the moving ends of the two linking rods are movable relative to the fixing frame and the moving frame respectively;
a power source configured to move the moving end of one of the two linking rods to increase or decrease a distance between the power source and said moving end.

14. The illuminating device as claimed in claim 1, wherein the position-adjusting device comprises:
a fixing frame mounted on the base;
a moving frame on which the at least one light source is mounted;
a power source connecting the fixing frame and the moving frame, and being configured to make the fixing frame and the moving frame move linearly toward or away from each other to increase or decrease a distance between the fixing frame and the moving frame.

\* \* \* \* \*